United States Patent
Xu (10) Patent No.: US 12,124,485 B2
(45) Date of Patent: Oct. 22, 2024

(54) DISAMBIGUATING UNRECOGNIZED ABBREVIATIONS IN SEARCH QUERIES USING MACHINE LEARNING

(71) Applicant: FMR LLC, Boston, MA (US)

(72) Inventor: Yourong Xu, Newton, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 17/897,593

(22) Filed: Aug. 29, 2022

(65) Prior Publication Data

US 2024/0070178 A1    Feb. 29, 2024

(51) Int. Cl.
*G06F 16/00* (2019.01)
*G06F 16/33* (2019.01)
*G06F 16/332* (2019.01)
*G06F 16/338* (2019.01)
*G06N 5/022* (2023.01)

(52) U.S. Cl.
CPC ...... *G06F 16/3322* (2019.01); *G06F 16/3338* (2019.01); *G06F 16/3346* (2019.01); *G06F 16/338* (2019.01); *G06N 5/022* (2013.01)

(58) Field of Classification Search
None
See application file for complete search history.

(56) References Cited

U.S. PATENT DOCUMENTS

| | | | |
|---|---|---|---|
| 7,028,038 B1 * | 4/2006 | Pakhomov | G06F 40/284 707/765 |
| 8,204,874 B2 | 6/2012 | Wei et al. | |
| 8,498,999 B1 | 7/2013 | Bhalotia | |
| 9,031,832 B2 | 5/2015 | Boguraev et al. | |
| 2008/0033714 A1 * | 2/2008 | Gupta | G06F 40/284 704/9 |
| 2008/0086297 A1 * | 4/2008 | Li | G06F 40/40 704/3 |
| 2009/0259629 A1 * | 10/2009 | Wei | G06F 16/3338 |

(Continued)

OTHER PUBLICATIONS

A.P. Ben Veyseh et al., "MadDog: A Web-based System for Acronym Identification and Disambiguation," arXiv:2101.09893v1 [cs.CL] Jan. 25, 2021, accessed at https://arxiv.org/pdf/2101.09893v1.pdf, 8 pages.

*Primary Examiner* — Polina G Peach
(74) *Attorney, Agent, or Firm* — Cesari and McKenna, LLP (57) ABSTRACT

Methods and apparatuses are described for disambiguating unrecognized abbreviations in search queries using machine learning. A server computing device detects unrecognized abbreviations in an initial search query received from a user of a client computing device. The server generates candidate words for each of the unrecognized abbreviations in the initial search query. For each of the abbreviations, the server executes a trained disambiguation machine learning model using the candidate words as input to generate, for each candidate word, a probability that the candidate word is intended by the user to be an expansion of the unrecognized abbreviation. The server selects one of the candidate words as a replacement word for the unrecognized abbreviation. The server generates a new search query by replacing each of the unrecognized abbreviations in the initial search query with the corresponding replacement word and retrieves search results by executing a search using the new search query.

24 Claims, 6 Drawing Sheets

(56) References Cited

U.S. PATENT DOCUMENTS

| | | | | |
|---|---|---|---|---|
| 2012/0117082 | A1* | 5/2012 | Koperda | G06F 16/24578 |
| | | | | 707/E17.084 |
| 2013/0246047 | A1* | 9/2013 | Vassilieva | G06F 40/295 |
| | | | | 704/9 |
| 2014/0136567 | A1* | 5/2014 | Bhalotia | G06F 16/3338 |
| | | | | 707/771 |
| 2014/0344263 | A1* | 11/2014 | Dhamdhere | G06F 16/3338 |
| | | | | 707/E17.084 |
| 2017/0199963 | A1* | 7/2017 | Kondadadi | G16H 15/00 |
| 2018/0189265 | A1* | 7/2018 | Chen | G06F 17/18 |
| 2018/0293494 | A1* | 10/2018 | Guo | G06F 40/284 |
| 2019/0171728 | A1* | 6/2019 | Wakankar | G06F 16/90324 |
| 2020/0073996 | A1* | 3/2020 | Wright | G06N 20/00 |
| 2020/0104360 | A1* | 4/2020 | Gahlot | G06N 3/08 |
| 2020/0110753 | A1* | 4/2020 | Silk | G06F 9/451 |
| 2020/0201898 | A1* | 6/2020 | Esponda | G06F 40/295 |
| 2020/0311738 | A1* | 10/2020 | Gupta | G06F 16/22 |
| 2021/0149994 | A1* | 5/2021 | Kim | G06F 40/295 |
| 2021/0192283 | A1* | 6/2021 | Guo | G06N 3/08 |
| 2021/0303786 | A1* | 9/2021 | Veyseh | G06N 3/084 |
| 2022/0350810 | A1* | 11/2022 | Majumdar | G06N 20/00 |

\* cited by examiner

| Abbreviation | Candidate Words | User feedback indicator of correct expansion |
|---|---|---|
| acct | accidental | FALSE |
| acct | accommodate | FALSE |
| acct | account | TRUE |
| man | mandatory | FALSE |
| man | manger | FALSE |
| man | manipulation | FALSE |
| man | manner | FALSE |
| man | manual | TRUE |

402  404  406

400

| Abbreviation 502 | Candidate Words 504 | Probability 506 |
|---|---|---|
| addr | address | 0.93 |
| addr | addressing | 0.85 |
| addr | addressline | 0.88 |
| addr | adhere | 0.34 |
| addr | adhered | 0.45 |
| addr | adherence | 0.46 |
| addr | adheres | 0.34 |
| addr | adopter | 0.34 |
| addr | adoption | 0.34 |
| addr | adverse | 0.32 |
| addr | adversely | 0.23 |
| addr | adviser | 0.35 |
| addr | advisers | 0.35 |
| addr | advisor | 0.37 |

DISAMBIGUATING UNRECOGNIZED ABBREVIATIONS IN SEARCH QUERIES USING MACHINE LEARNING

TECHNICAL FIELD

This application relates generally to methods and apparatuses, including computer program products, for disambiguating unrecognized abbreviations in search queries using machine learning.

BACKGROUND

Many medium and large organizations maintain a corpus of domain-specific documents and information that is used by employees to conduct their duties. In one example, a customer service representative (CSR) may rely upon a plurality of digital documents in order to respond to inquiries received from customers of the organization. The customer may initiate a voice call or online chat/messaging session with the CSR to ask questions and obtain information that is relevant to the user. After receiving the user's inquiry, the CSR may need to search a database of domain-specific documents by providing one or more search terms in a query string to an internal document repository in order to locate documents that are responsive to the customer.

Most organizations utilize an enterprise search engine that is internal to the organization and helps employees locate necessary information from enterprise documents. In some instances, the enterprise documents can comprise text files (.pdf, .doc), web pages (.html, .xml) and other types of structured and unstructured text data. In one example, an enterprise search engine can organize documents by indexing them—e.g., compiling all tokens (or terms) and their positions in the documents. To find the information, an employee can input one or many search queries and receives a list of snippets of the documents in a single search query, which may be ranked according to the relevance of the document and query terms; i.e., if an employee enters the query "apple", all documents that contains term "apple" will likely be part of the search results.

Often, the CSR may use domain-specific abbreviations when entering a search query into the enterprise search engine because, e.g., such abbreviations are understood by the CSR as having a specific meaning in the applicable domain. However, these abbreviations are typically informal and not used in, or understood as having the same meaning in, other domains. Because the digital documents may not be from the same domain as the CSR's organization, a search engine that queries the document repository using an informal abbreviation entered by the CSR would likely provide search results that are irrelevant, unexpected, or incomplete. In some cases, the search engine may even fail to return any results—leading to a less-than-satisfactory experience for the CSR and customer.

SUMMARY

Therefore, what is needed are methods and systems for automatically disambiguating unrecognized abbreviations in search queries, particularly domain-specific abbreviations that are used to search in an enterprise document repository. The techniques described herein advantageously leverage advanced machine learning frameworks, such as a trained disambiguation model, to identify unrecognized abbreviations in search queries, determine candidate replacement words, and select a replacement word that has a high probability of being the expanded version of the unrecognized abbreviation that the user intended. Then, the methods and systems beneficially update the search query to include the replacement word(s) instead of the unrecognized abbreviations, and execute the search query to return useful and relevant search results.

As can be appreciated, the use of a trained disambiguation machine learning model has several advantages over existing search systems. First, unlike traditional web search engines, the systems and methods described herein do not leverage search logs, click logs, or anchor text to disambiguate the abbreviations. Second, the systems and methods described herein do not need to rely on the context of search terms in a given search query in order to infer a relationship between an unrecognized abbreviation and a replacement word. In a typical environment, nearly 80% of enterprise search queries contain only three or fewer words, and nearly 30% of enterprise search queries contain only one word. Because of this, such queries provide little to no context information that can be used to disambiguate an abbreviation. Therefore, unlike prior approaches that determine relationships between search terms in a query in order to deduce the meaning of an abbreviation, the techniques described herein can determine the most likely expansion of an unrecognized abbreviation independently of any context information in the search string.

The invention, in one aspect, features a system for disambiguating unrecognized abbreviations in search queries using machine learning. The system comprises a server computing device having a memory for storing computer-executable instructions and a processor that executes the computer-executable instructions. The server computing device detects one or more unrecognized abbreviations in an initial search query received from a user of a client computing device. The server computing device generates one or more candidate words for each of the unrecognized abbreviations in the initial search query. For each of the unrecognized abbreviations, the server computing device executes a trained disambiguation machine learning model using the one or more candidate words for the unrecognized abbreviation as input to generate, for each candidate word, a probability that the candidate word is intended by the user to be an expansion of the unrecognized abbreviation, and selects one of the candidate words as a replacement word for the unrecognized abbreviation based upon the generated probabilities. The server computing device generates a new search query based upon the initial search query by replacing each of the unrecognized abbreviations in the initial search query with the corresponding replacement word. The server computing device retrieves one or more search results by executing a search engine on the new search query and displays the one or more search results to the user of the client computing device.

The invention, in another aspect, features a computerized method of disambiguating unrecognized abbreviations in search queries using machine learning. A server computing device detects one or more unrecognized abbreviations in an initial search query received from a user of a client computing device. The server computing device generates one or more candidate words for each of the unrecognized abbreviations in the initial search query. For each of the unrecognized abbreviations, the server computing device executes a trained disambiguation machine learning model using the one or more candidate words for the unrecognized abbreviation as input to generate, for each candidate word, a probability that the candidate word is intended by the user to be an expansion of the unrecognized abbreviation, and selects one of the candidate words as a replacement word for the unrecognized abbreviation based upon the generated probabilities. The server computing device generates a new search query based upon the initial search query by replacing each of the unrecognized abbreviations in the initial search query with the corresponding replacement word. The server computing device retrieves one or more search results by executing a search engine on the new search query and displays the one or more search results to the user of the client computing device.

Any of the above aspects can include one or more of the following features. In some embodiments, the server computing device receives a selection of one of the displayed search results from the user of the client computing device. In some embodiments, the server computing device generates an abbreviation-replacement word pair for each replacement word in the new search query based upon the selection received from the user of the client computing device. In some embodiments, the server computing device stores the abbreviation-replacement word pairs in a disambiguation dictionary data structure.

In some embodiments, the server computing device generates the trained disambiguation machine learning model by capturing a corpus of unstructured text from one or more data sources and selecting one or more terms from the corpus of unstructured text, each term comprising a text string shorter than a predetermined length. For each term, the server computing device executes the search engine on the term to determine whether any search results are returned, classifies the term as an unrecognized abbreviation when no search results are returned by the search engine, identifies one or more candidate words for the unrecognized abbreviation from a plurality of indexed documents, determines that one of the candidate words is a correct expansion of the unrecognized abbreviation, and assigns the determined candidate word to the unrecognized abbreviation. The server computing device generates a training data set based upon the one or more unrecognized abbreviations and the assigned candidate words and trains a disambiguation machine learning model on the training data set to generate the trained disambiguation machine learning model.

In some embodiments, identifying one or more candidate words for the unrecognized abbreviation from a plurality of indexed documents comprises identifying a first set of words in the plurality of indexed documents that share a first character with the unrecognized abbreviation, selecting one or more words from the first set of words that include all of the characters of the unrecognized abbreviation, and assigning the selected words as the one or more candidate words. In some embodiments, the server computing device determines that one of the candidate words is a correct expansion of the unrecognized abbreviation by displaying the unrecognized abbreviation and the candidate words on a remote computing device and receiving a selection of one of the candidate words from a user of the remote computing device. In some embodiments, the corpus of unstructured text comprises one or more of: chat message logs or user comments to articles.

In some embodiments, the trained disambiguation machine learning model comprises at least one of a linear regression algorithm, a decision tree algorithm, a support vector machine, a random forest algorithm, a neural network, or a Bayesian classification algorithm. In some embodiments, the server computing device converts each of the one or more candidate words into a first numeric representation and each of the and the one or more unrecognized abbreviations into a second numeric representation prior to executing the trained disambiguation machine learning model. In some embodiments, the first numeric representation and the second numeric representation each comprises a multidimensional vector of one or more features.

In some embodiments, detecting one or more unrecognized abbreviations in an initial search query received from a user of a client computing device comprises executing the search engine on each term in the initial search query to determine whether any search results are returned; identifying one or more terms in the initial search query that (i) are shorter than a predetermined length and (ii) do not return any search results in the search engine; and assigning the identified terms in the initial search query as the detected unrecognized abbreviations. In some embodiments, generating one or more candidate words for each of the unrecognized abbreviations in the initial search query comprises, for each abbreviation: identifying a first set of words in a plurality of indexed documents that share a first character with the unrecognized abbreviation; selecting one or more words from the first set of words that include all of the characters of the unrecognized abbreviation; and assigning the selected words as the one or more candidate words.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
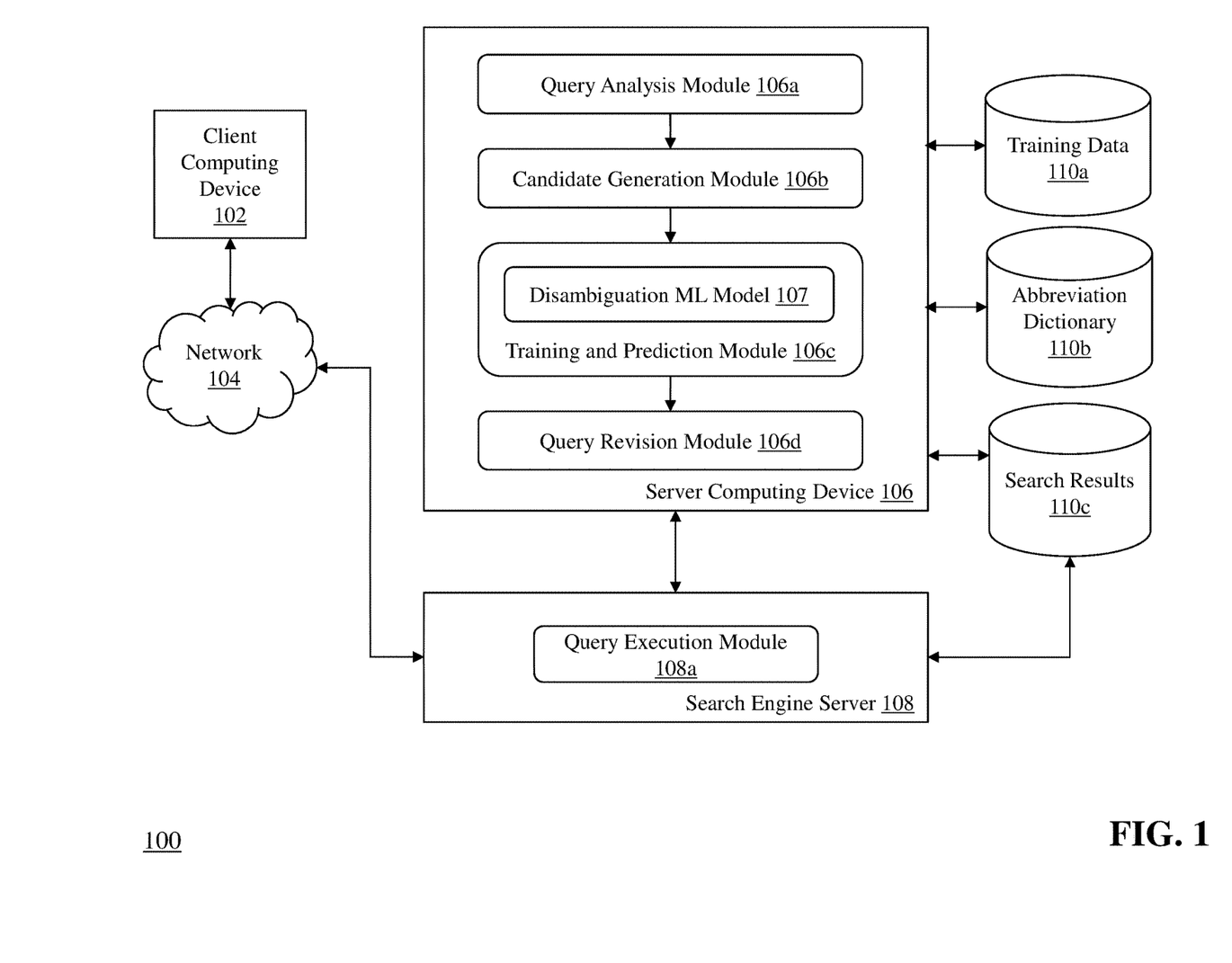
FIG. 1 is a block diagram of a system for disambiguating unrecognized abbreviations in search queries using machine learning.

FIG. 1 is a block diagram of a system 100 of disambiguating unrecognized abbreviations in search queries using machine learning. System 100 includes client computing device 102, communication network 104, server computing device 106 that includes query analysis module 106*a*, candidate generation module 106*b*, training and prediction module 106*c*, and query revision module 106*d*. Training and prediction module 106*c* includes disambiguation machine learning (ML) model 107. System 100 further comprises search engine server computing device 108 that includes query execution module 108*a*. System 100 also comprises a plurality of databases—including training data database 110a, abbreviation dictionary database 110b, and search results database 110c.

Client computing device 102 connects to communication network 104 in order to communicate with search engine server 108 to participate in one or more web browsing sessions, including the execution of one or more search queries by query execution module 108a as entered by a user of client computing device 102. As can be appreciated, search engine server 108 can be configured to host one or more websites and/or connect to other computing devices that provide web-related content including search functionality to client computing device 102. For example, client computing device 102 can establish a communication session with query execution module 108a of search engine server 108 (e.g., via HTTP or HTTPS) using a uniform resource locator (URL) assigned to search engine server 108, view a search interface web page and receive search results and other website-related content from search engine server 108. A user at client computing device 102 can interact with (e.g., browse) the search results provided by query execution engine 108a by activating links and navigating through the search results. In some embodiments, the search results comprise a plurality of webpages and each page of search results is associated with a particular URL. In some embodiments, client computing device 102 is coupled to an associated display device (not shown). For example, client computing device 102 can provide a graphical user interface (GUI) via the display device that is configured to receive input from a user of the client computing device (such as a search query string) and to present output (e.g., search results and webpages) to that user. In some embodiments, client computing device 102 can be configured to connect to server computing device 106 via network 104.

Exemplary client computing devices 102 include but are not limited to desktop computers, laptop computers, tablets, mobile devices, smartphones, and Internet appliances. It should be appreciated that other types of computing devices that are capable of connecting to the components of system 100 can be used without departing from the scope of invention. Although FIG. 1 depicts a single client computing device 102, it should be appreciated that system 100 can include any number of client computing devices.

Communication network 104 enables client computing device 102 to communicate with search engine server 108. Network 104 is typically a wide area network, such as the Internet and/or a cellular network. In some embodiments, network 104 is comprised of several discrete networks and/or sub-networks (e.g., cellular to Internet).

Server computing device 106 is a device including specialized hardware and/or software modules that execute on a processor and interact with memory modules of server computing device 106, to receive data from other components of system 100, transmit data to other components of system 100, and perform functions for disambiguating unrecognized abbreviations in search queries using machine learning as described herein. Server computing device 106 includes query analysis module 106a, candidate generation module 106b, training and prediction module 106c, and query revision module 106d that execute on one or more processors of server computing device 106. As mentioned above, training and prediction module 106c includes disambiguation machine learning model 107. In some embodiments, modules 106a-106d and model 107 are specialized sets of computer software instructions programmed onto one or more dedicated processors in server computing device 106 and can include specifically-designated memory locations and/or registers for executing the specialized computer software instructions.

Although modules 106a-106d and model 107 are shown in FIG. 1 as executing within the same server computing device 106, in some embodiments the functionality of the modules 106a-106d and model 107 can be distributed among a plurality of server computing devices. As shown in FIG. 1, server computing device 106 enables modules 106a-106d and model 107 to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. Exemplary functionality of modules 106a-106d and model 107 is described in detail throughout the specification.

In some embodiments, disambiguation ML model 107 is a trained artificial intelligence framework configured to receive data representative of unrecognized abbreviations and associated candidate words, as determined from one or more search queries, as input and generate a probability that a given candidate word is the most likely expansion of the abbreviation. For example, disambiguation ML model 107 can comprise one or more machine learning frameworks or algorithms that are executed on embeddings (e.g., multidimensional vectors or tensors) generated from the candidate words to determine the probability. Exemplary machine learning frameworks and algorithms can include, but are not limited to, nearest neighbor, logistic regression, ridge regression, Random Forest, extra trees, ensemble voting classification, stacked classification, gradient boosting on decision trees (e.g., CatBoost available from catboost.ai, LightGBM available from Microsoft Corp., XGBoost available from xgboost.ai), feed forward neural networks (e.g., multilayer perceptron (MLP)), and others. As can be appreciated, machine learning model 107 can be trained on existing abbreviations and indexed documents that contain the abbreviations in order to enhance the accuracy of the probability values generated by model 107. Also, as abbreviation-replacement word pairs are learned over time, and additional search results/indexed documents are collected by system 100, this additional data can be used to retrain disambiguation ML model 107 for a further increase in accuracy and performance.

As can be appreciated, probability data generated by disambiguation ML model 107 is actionable and can be utilized by other components of system 100 to interface with client computing device 102 and/or other devices (not shown) in a manner that leverages the insight gained. For example, training and prediction module 106e can execute disambiguation ML model 107 to analyze one or more unrecognized abbreviations in an initial search query entered by a user of client computing device 102 and produce a probability for candidate replacement words for each abbreviation. In response to this insight, query revision module 106d can automatically generate a new search query by replacing the unrecognized abbreviations with appropriate replacement words based upon the probability determined by model 107. Query execution module 108a then executes the new search query on, e.g., search results database 110c to retrieve one or more search results, such as indexed documents, that match the search query—including the replacement words. Search engine server 108 can return the search results to client computing device 102 for display to a user of device 102 (e.g., via a web browser). It should be appreciated that, in some embodiments, the query analysis, abbreviation replacement, query revision, and revised query execution described herein occurs in real time as users enter search queries at client computing device 102. Advantageously, in this way users have a seamless search experience and automatically receive search results that are relevant to the unrecognized abbreviations.

Search engine server 108 is a computing device (or set of computing devices) to which client computing device 102 can connect to submit search queries, receive search results relating to the submitted queries, and interact with the search results. Search engine server 108 is a combination of hardware, including one or more special-purpose processors and one or more physical memory modules, and specialized software modules (such as query execution module 108a) that are executed by a processor of search engine server 108. In some embodiments, search engine server 108 can comprise a web server that provides search results via one or more websites. Typically, a website comprises a plurality of visual and non-visual elements that make up the content transmitted and displayed to a user when, e.g., browser software on client computing device 102 connects to search engine server 108 via communication network 104 (e.g., Internet) and requests execution of a search query. The elements of a website include, but are not limited to, webpages (e.g., HTML documents), image files, layouts, color sets, stylesheets, document object models (DOM), tracking elements, metadata, links, URLs, and content (e.g., text, audio, video). As can be understood, in some embodiments each page of search results is associated with a particular URL that identifies the page's location and provides a mechanism for retrieving the page for display on client computing device 102. Query execution engine 108a is configured to receive search queries from client computing device 102 and/or query revision module 108a and retrieve relevant results (such as documents, URLs, links, and the like) for the search query from search results database 110c.

Databases 110a-110c are located on a computing device (or in some embodiments, on a set of computing devices) coupled to server computing device 106 and/or search engine server 108 and databases 110a-110c are configured to receive, generate, and store specific segments of data relating to the process of disambiguating unrecognized abbreviations in search queries using machine learning as described herein. In some embodiments, all or a portion of databases 110a-110c can be integrated with server computing device 106, search engine server 108, or be located on a separate computing device or devices. Databases 110a-110c can comprise one or more databases configured to store portions of data used by the other components of system 100 as will be described in greater detail below.

In some embodiments, training data database 110a comprises data used by training and prediction module 106c to train and/or retrain disambiguation ML model 107. For example, the training data can comprise recognized or unrecognized abbreviations, related candidate words, and search result data such as indexed documents, generated by system 100 over time and stored in database 110a. As explained herein, module 106c can use training data to initially train disambiguation model 107 prior to deploying the model to production use and to periodically retrain model 107 based upon learning, e.g., new abbreviations and candidate words in order to improve the precision of model 107. Further information about training and execution of machine learning model 107 is provided later in the specification.

In some embodiments, abbreviation dictionary database 110b comprises a list of known abbreviations and corresponding candidate words, including a matched candidate word that represents an expansion of the corresponding abbreviation. For example, an abbreviation can be 'acct' and the matched candidate word can be 'account.' As can be appreciated, database 110b can store one or more dictionaries of abbreviations that are domain-specific and server computing device 106 can select a particular dictionary based upon a domain that is being searched by query execution module 108a.

In some embodiments, search results database 110c comprises content that is searchable by query execution module 108a to generate search results for display on client computing device 102. For example, query execution module 108a can retrieve content from database 110c that matches one or more terms or aspects of a search query. In an exemplary embodiment, database 110c comprises a plurality of indexed digital documents that are associated with one or more subject matter domains, and query execution module 108a can determine whether one or more search terms in a given query are found within one or more digital documents. Then, module 108a can provide the matching documents to client computing device 102 as part of the search results. It should be appreciated, however, that the techniques described herein are equally applicable to other types of indexed, searchable content.

Figure 2:
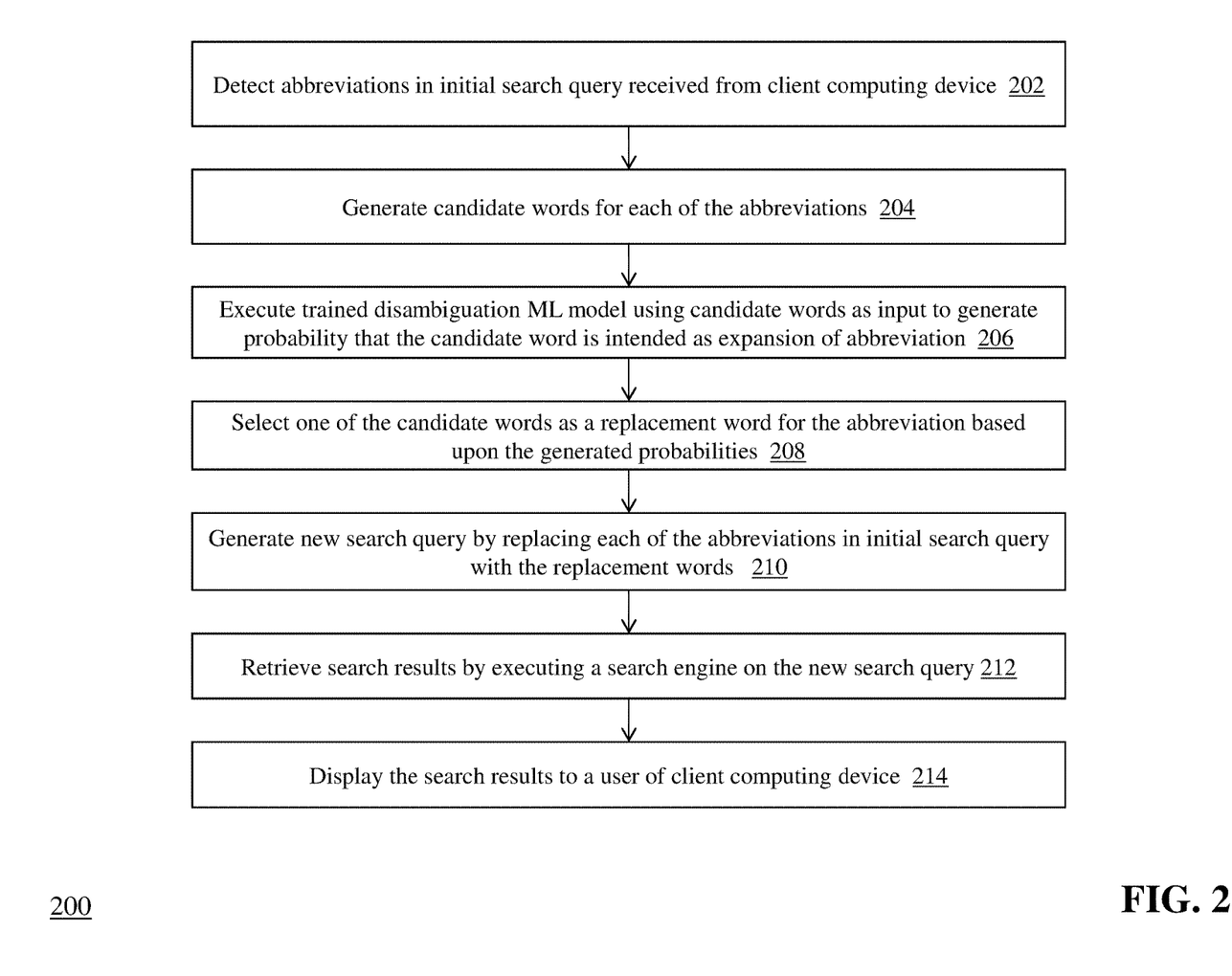
FIG. 2 is a flow diagram of a computerized method of disambiguating unrecognized abbreviations in search queries using machine learning.

FIG. 2 is a flow diagram of a computerized method 200 of disambiguating unrecognized abbreviations in search queries using machine learning, using system 100 of FIG. 1. As mentioned above, a user at client computing device 102 navigates to a search interface webpage provided by search engine server 108. The search interface webpage enables the user to enter a search query (e.g., a string of characters that comprises one or more search terms and/or keywords) and view corresponding search results. As mentioned above, in some embodiments the search engine server 108 is an enterprise-specific application server that enables employees, customers or other entities to search for information relating to a particular domain. As one example, the search engine server 108 can provide a portal for customer service representatives to search for documentation that will assist the representative in responding to a customer's question or information request.

In certain domains, users may include domain-specific abbreviations as part of a search query. These domain-specific abbreviations may be understood by the specific people who operate in the domain, but the abbreviations may not correlate to a customary or well-understood word or phrase that would appear in typical domain-agnostic search results. For example, in a financial services domain, a user could enter the search query 'brokerage man' (with the abbreviation 'man') when searching for, e.g., a brokerage service manual. While the user may understand and intend that the abbreviation 'man' represents the expanded word 'manual,' a search engine that queries a domain-agnostic database may find results that are irrelevant to the user's intended meaning. In another example, the search results database may contain domain-specific documents that are responsive to the user's query—but because such documents do not use the abbreviation entered by the user, the search engine would erroneously consider those documents as non-responsive to the search query. As a result, the search engine does not retrieve those documents as part of the search results. To overcome this issue, server computing device 106 is configured to identify unrecognized abbreviations in a search query and replace these abbreviations with the most likely (or best fitting) expansions in the search query prior to execution by the search engine.

Upon receiving a user's search query from client computing device, query execution module 108a transmits an initial search query to query analysis module 106a of server computing device 106. Query analysis module 106a detects (step 202) one or more abbreviations in the initial search query received from client computing device 102. In some embodiments, query analysis module 106a detects the unrecognized abbreviations in the initial search query by extracting each term from the initial search query and then executing a search using query execution module 108a for each term in the initial search query against, e.g., search results database 110c to determine whether any search results are returned. In an example, a user can enter both unrecognized abbreviations and recognized abbreviations in the same search query. By executing a search on each term in the query, module 106a can differentiate between abbreviations that are used in the content contained in search result database 110c (meaning that the abbreviations may have a commonly-understood meaning) and abbreviations that are not used in the content contained in search result database 110c (indicating that the abbreviations are domain-specific or not commonly used). Query analysis module 106a identifies one or more terms in the initial search query that (i) are shorter than a predetermined length (e.g., six characters) and (ii) do not return any search results in the search engine. Typically, abbreviations are shorter than six characters; however, other methodologies for determining an abbreviation can be used. Also, module 106a differentiates between abbreviations that do return one or more search results (indicating that the abbreviation may be a regularly-used term and have a broadly-understood meaning) and abbreviations that do not return any search results (indicating that the abbreviation is unrecognized). In addition, this methodology also distinguishes between acronyms (which are short terms containing the first letter of each word in an expanded set of words) and abbreviations. As can be appreciated, it is more likely that one or more search results will be returned by the search engine for an acronym—therefore, module 106a does not identify these terms as unrecognized abbreviations.

Once module 106a has identified one or more terms that meet the above criteria, module 106a assigns the identified terms in the initial search query as detected unrecognized abbreviations. In some embodiments, query analysis module 106a can remove certain elements of the search query that are not relevant to the search execution when determining the abbreviations. For example, module 106a can remove stopwords, non-alphanumeric characters (e.g., punctuation), search-specific metadata or syntax, and the like.

Once the unrecognized abbreviations are determined by query analysis module 106a, candidate generation module 106b receives the abbreviations and generates (step 204) candidate words for each of the abbreviations. Typically, an abbreviation comprises letters that appear in the expanded word in the same order and include the first letter of the word. Using this rule, in some embodiments, candidate generation module 106b searches the indexed digital documents in search results database 110c to locate words that (i) start with the first letter of the abbreviation and (ii) comprise each character of the abbreviation in the same order as the characters appear in the abbreviation. For example, module 106b can search the documents with the abbreviation 'acct' and locate the following words: 'accidental,' 'accommodate,' 'account' because each of these words contains the letters 'acct' in that order and start with the letter 'a.' In some embodiments, module 106b can be configured to eliminate duplicate letters in the abbreviation when searching for candidate words (such as changing 'acct' to 'act'). In addition, in some embodiments module 106b can be configured to construct one or more n-grams from the given abbreviation for use in determining candidate words. If an abbreviation is 'acct,' module 106b can generate n-grams 'acc,' 'act,' and 'acct' for use in deciding which words should be candidate words. Other methods for determining expanded words that are candidates for a given abbreviation can be used by module 106b without departing from the scope of invention.

When the abbreviations and associated candidate words have been discovered by module 106b, training and prediction module 106c executes (step 206) trained disambiguation ML model 107 using the candidate words as input to generate a probability that each candidate word is intended by the user as an expansion of the abbreviation. In some embodiments, disambiguation ML model 107 comprises a machine learning framework such as a linear regression algorithm, a decision tree algorithm, a support vector machine, a random forest algorithm, a neural network, or a Bayesian classification algorithm that is trained using a training data set (e.g., known abbreviations and matching words that appear in the indexed documents) to predict the probability. Typically, model 107 is trained prior to deploying the model 107 into production use.

Figure 3:
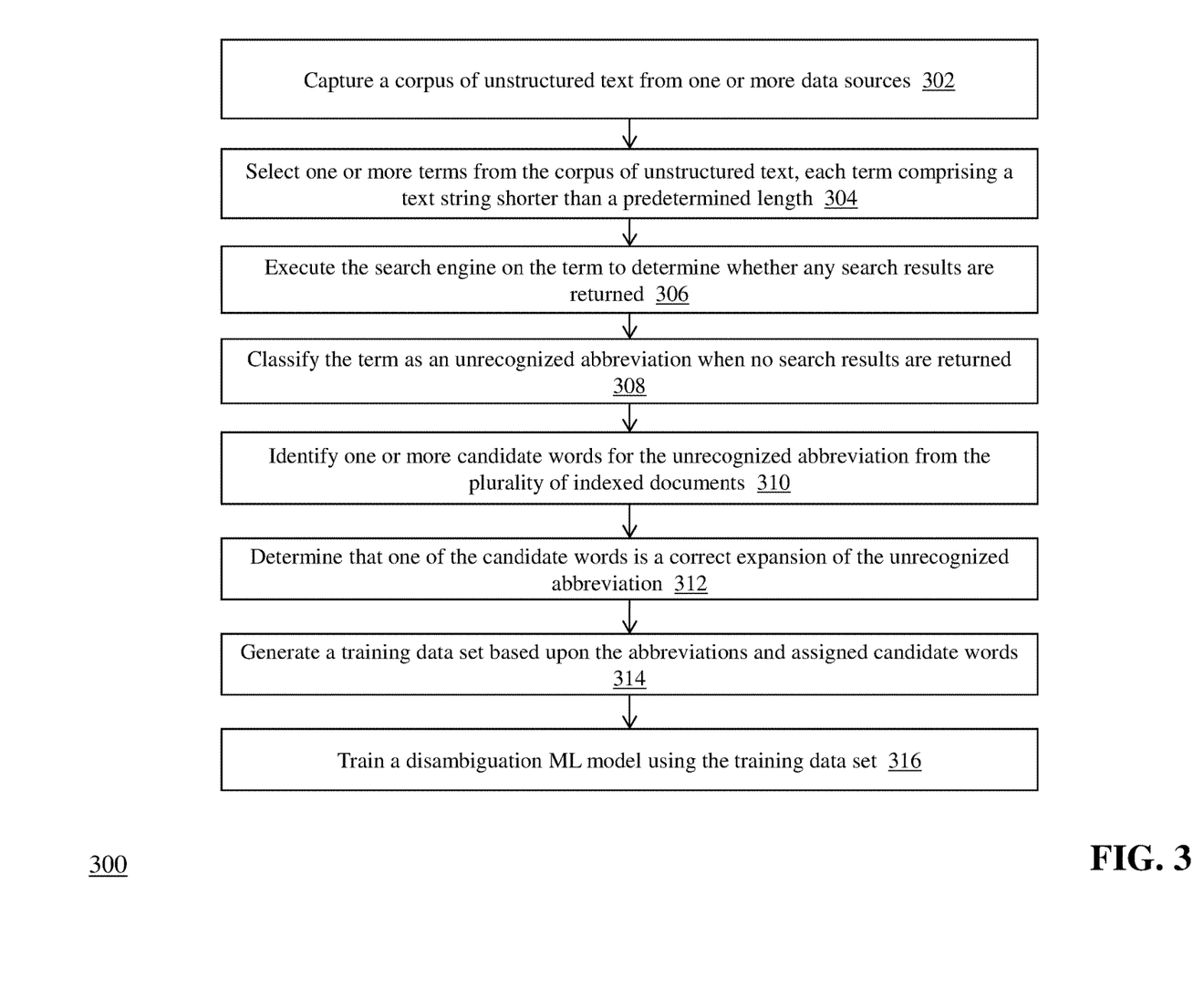
FIG. 3 is a flow diagram of a computerized method of training a disambiguation machine learning (ML) model.

FIG. 3 is a flow diagram of a computerized method of training disambiguation ML model 107, using system 100 of FIG. 1. Training and prediction module 106c captures (step 302) a corpus of unstructured text from one or more data sources. In one example, module 106c retrieves a corpus of text corresponding to chat message logs and/or user comments to articles from a particular subject matter domain. The chat message logs and user comments can be stored in a single data source or be distributed among a plurality of data sources. As can be appreciated, users conversant in the relevant domain frequently use domain-specific abbreviations in communicating with others via chat messages or comments. For example, a customer service representative may confer with colleagues about a particular customer issue via an internal chat application. The CSRs may use abbreviations in the chat that are commonly understood by each person, but these abbreviations may not be recognized or used in a domain-specific or domain-agnostic document repository. Therefore, mining this type of unstructured text can provide useful and relevant training data for model 107.

Next, module 106c selects (step 304) one or more terms from the corpus of unstructured text, each term comprising a text string shorter than a predetermined length. In one embodiment, module 106c uses a threshold of six characters as the filter on length to determine whether a term is considered an abbreviation—as most abbreviations are shorter than this length. Of course, other methods to determine whether a term is an abbreviation can be used without departing from the scope of invention. For each selected term, training and prediction module 106c executes (step 306) the search engine on the term to determine whether any search results are returned from, e.g., search results database 110c. In some embodiments, module 106c generates a separate search query containing each term and transmits the search queries to query execution engine 108a of search engine server 108. Query execution engine 108a executes each of the search queries against a plurality of indexed documents in search results database 110c to determine, for each query, whether one or more documents match the query (i.e., whether the abbreviation is contained within at least one of the documents). Query execution engine 108a returns an indicator to training and prediction module 106c for each search, the indicator corresponding to whether search results were located in database 110c. For example, the indicator can be a binary value (e.g., 0 if no results are found and 1 if at least one result is found). In some embodiments, query execution engine 108a can return the search results to module 106c along with, or instead of, the indicator.

Upon receiving the indicator for each search query, module 106c classifies (step 308) the term as an unrecognized abbreviation when no search results are returned by the search engine server 108. This outcome indicates that the abbreviation is not one that is commonly used in the domain and thus must be replaced in an initial search query with an expanded word. In some embodiments, module 106c can reference abbreviation dictionary database 110b as a second check on whether a term is an unrecognized abbreviation. For example, an abbreviation may not appear in any of the indexed documents (providing no search results), but the abbreviation may have been previously analyzed and assigned a corresponding expansion by system 100. In another example, the abbreviation may not appear in the indexed documents but it may be a commonly-understood abbreviation that is incorporated into database 110b. In these examples, module 106c can determine that the abbreviation is already associated with an expanded word and omits the abbreviation from further processing.

For the remaining unrecognized abbreviations, training and prediction module 106c identifies (step 310) one or more candidate words for the abbreviation from the plurality of indexed documents. In some embodiments, module 106c begins by identifying a first set of words in the plurality of indexed documents that share a first character with the abbreviation and then selecting one or more words from the first set of words that include all of the characters of the abbreviation in the same order. As an example, when the abbreviation is 'man,' module 106c can identify the following words as the first set of words: 'mandatory,' 'management,' 'manipulation,' 'manner,' 'manual.' Finally, module 106c assigns the selected words as the one or more candidate words for training the model 107.

In order to complete the training data, module 106c can receive feedback from one or more users of system 100 regarding which candidate word is the correct expansion of the given abbreviation. In some embodiments, during the model training phase, module 106c displays the abbreviations and corresponding candidate words to a user of client computing device 102 and asks the user to indicate which candidate word is the correct expansion. Based upon the user feedback, module 106c determines (step 312) that one of the candidate words is a correct expansion of the abbreviation and assigns the determined candidate word to the abbreviation.

Figure 4:
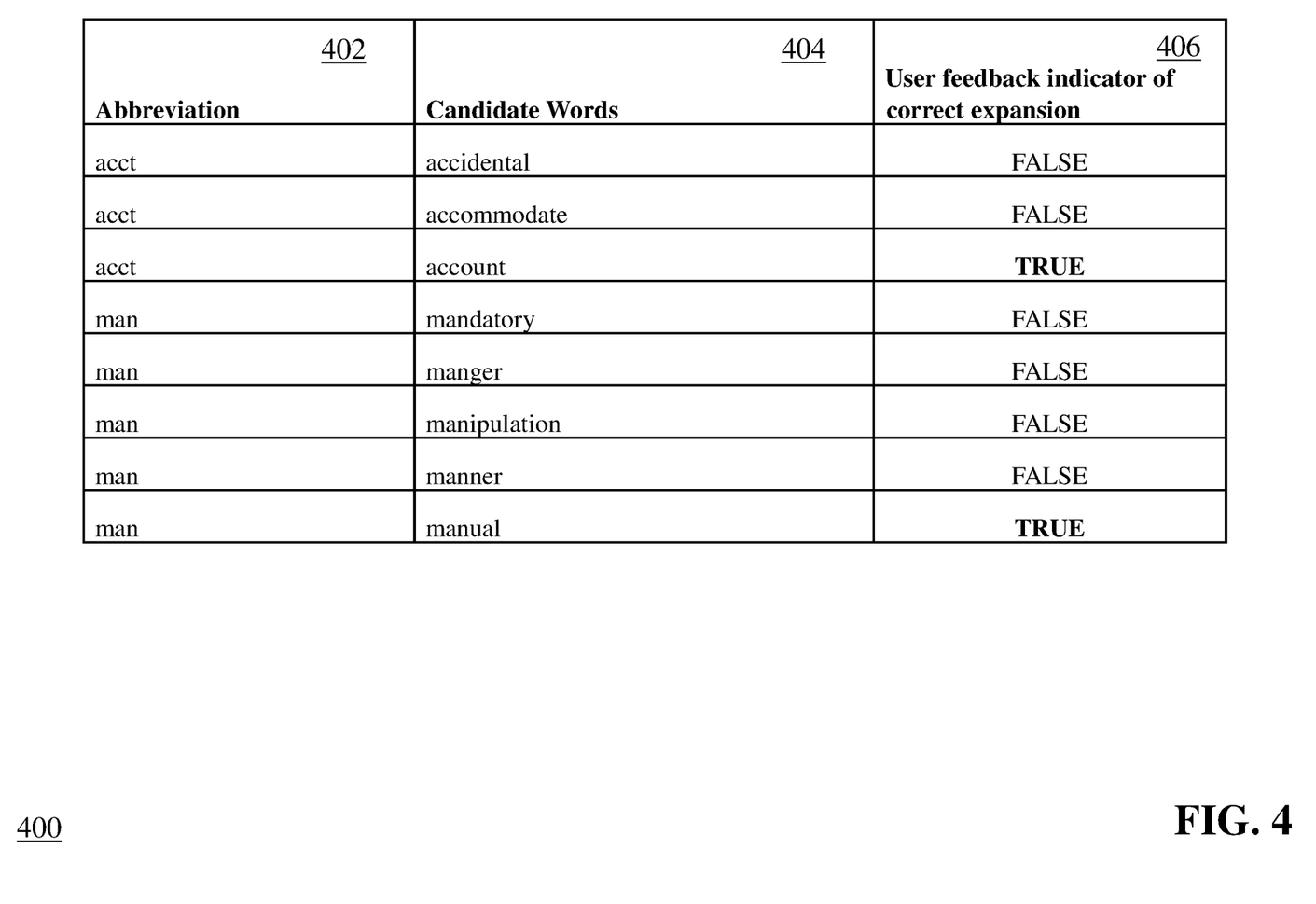
FIG. 4 is a diagram of an exemplary training data set generated by a training and prediction module for training the disambiguation ML model.

Next, training and prediction module 106c generates (step 314) a training data set based upon the one or more abbreviations and the assigned candidate words. FIG. 4 is a diagram of an exemplary training data set generated by module 106c for training disambiguation ML model 107. As shown in FIG. 4, the training data set 400 comprises a table with a column 402 for the abbreviation, a column 404 for the corresponding candidate words, and a column 406 for the user feedback data (e.g., TRUE where user feedback indicates the expanded word is the correct expansion of the abbreviation, and FALSE where user feedback indicates the expanded word is not the correct expansion of the abbreviation).

Module 106c then trains (step 316) a disambiguation ML model on the training data set to generate the trained disambiguation ML model 107. As mentioned above, the disambiguation ML model can be based on a machine learning framework such as at least one of a linear regression algorithm, a decision tree algorithm, a support vector machine, a random forest algorithm, a neural network, or a Bayesian classification algorithm. In order for model 107 to be able to receive the training data set as input, in some embodiments module 106c converts the training data set into a representation that can be ingested by model 107. For example, module 106c can convert each of the input data elements (e.g., abbreviations, candidate words) into a numeric representation such as a multidimensional vector of features associated with the data element prior to training the model 107.

Module 106c can partition the training data into a plurality of subsets and use some of the subsets for training and the remaining subset(s) for validation. For example, module 106c can generate four subsets of training data for training the model 107 and one subset of training data for validating the performance of a given machine learning framework used by model 107. In some embodiments, during training, module 106c determines the performance of the machine learning framework being trained (e.g., how accurate the probability values are) using an Area Under the Curve (AUC) of Receiver Operating Characteristics (ROC) performance metric. In some embodiments, module 106c trains model 107 a plurality of times (e.g., 5 times) and determines the mean of AUC and standard deviation of AUC from the validation subset in order to evaluate the relative performance of each ML framework.

Experiments were conducted on a select set of ML frameworks and the performance data is provided in Table 1 below:

TABLE 1

| ML Framework | Mean of AUC | Standard Deviation Of AUC |
|---|---|---|
| Lasso | 0.709 | 0.040 |
| Linear Regression (LR) | 0.818 | 0.029 |
| Linear Discriminant Analysis (LDA) | 0.837 | 0.028 |
| K-Nearest Neighbor (KNN) | 0.664 | 0.039 |
| Naïve Bayesian (NB) | 0.687 | 0.043 |
| Random Forest (RF) | 0.827 | 0.034 |
| Long Short-Term Memory (LSTM) | 0.720 | 0.000 |
| Extreme Gradient Boost (XGB) | 0.903 | 0.025 |

As shown above, these experiments showed that XGB produced the best results, with a mean of AUC closest to 1—indicating that XGB has a good measure of separability (the ability to distinguish between classes). Now that model 107 is trained, the model can be used to determine replacements for unrecognized abbreviations in search queries submitted to search engine server 108 in a production environment.

Turning back to FIG. 2, as mentioned above training and prediction module 106c executes (step 206) trained disambiguation ML model 107 using candidate words determined by module 106b to generate a probability that each candidate word is intended by the user of client computing device 102 as the expansion of the abbreviation. In some embodiments, the probability P is calculated by a function of:

LA=set of letters $\{a, b, \ldots\}$ from abbreviation $A_i$
LW=set of letters $\{a, b, \ldots\}$ from candidate word $W_i$
  Interactions of $LA_i$ and $LW_i$
Relative frequency of $W_t$ in a given document $D_t$ The probability of abbreviation-replacement word pair is represented by the following equation:

$$P(A_i \sim W_i) = f(LA, LW, LA \cap LW, \text{freq}(W_i|D_t))$$

In order for model 107 to be able to receive the abbreviation and the candidate words as input, in some embodiments module 106c converts the input data into a representation that can be ingested by model 107. For example, module 106c can convert each of the input data elements (e.g., abbreviations, candidate words) into a numeric representation such as a multidimensional vector of features associated with the data element prior to executing the model 107.

Figure 5:
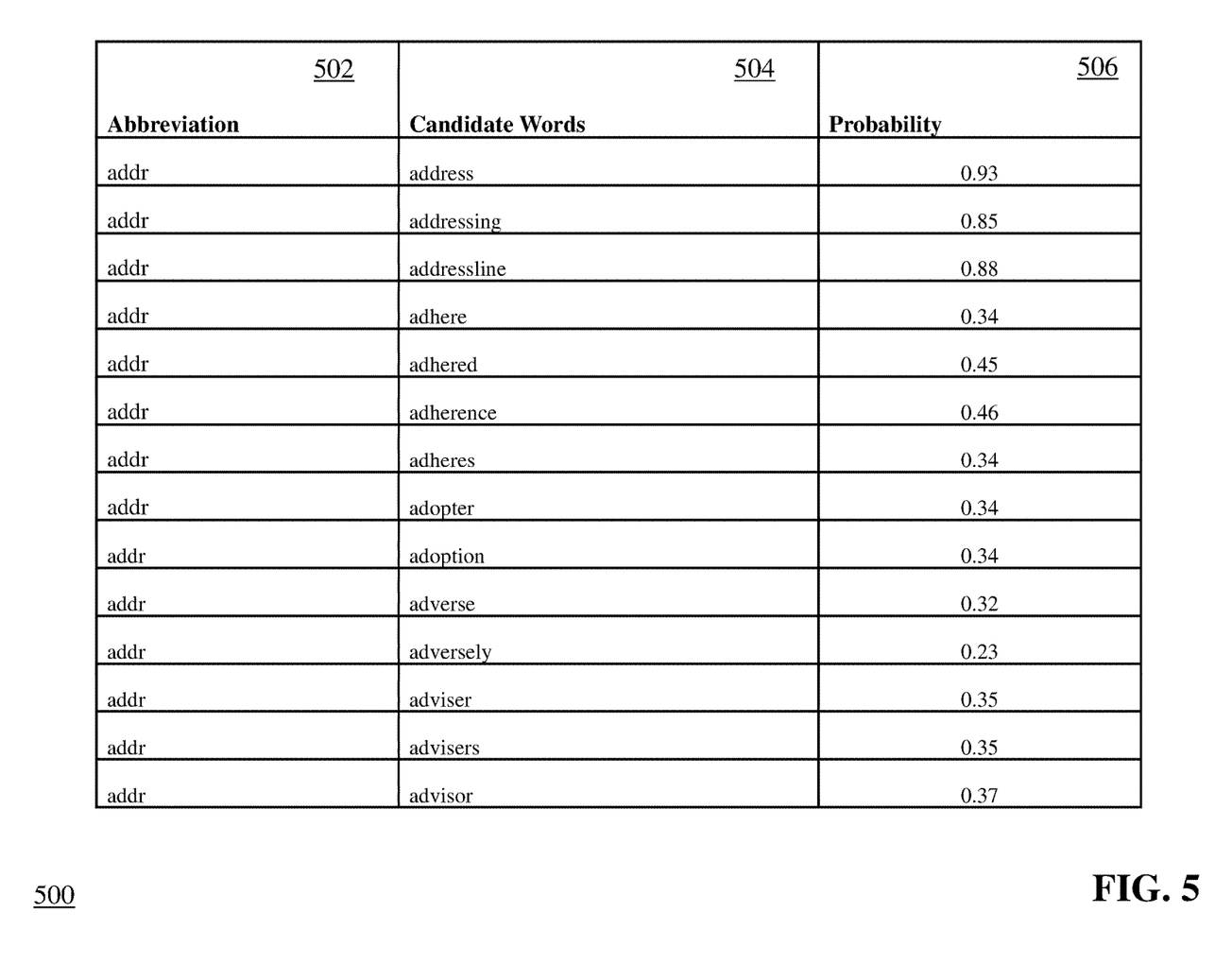
FIG. 5 is a diagram of an exemplary output data set generated by the disambiguation ML model upon execution.

The result of model execution 107 is a probability value (e.g., a percentage, a decimal, etc.) that the given candidate word represents the most likely expansion of the abbreviation as intended by the user of client computing device 102 who entered the initial search query. FIG. 5 is a diagram of an exemplary output data set 500 generated by disambiguation ML model 107 upon execution. As shown in FIG. 5, the output data set 500 comprises a matrix with three columns: a column 502 containing the input abbreviation (e.g., 'addr'), a column 504 containing the assigned candidate words, and a column 506 containing the resultant probability values generated by model 107. In this example, model 107 has determined that the expanded word 'address' has the highest probability (0.93) of the candidate words to be the intended expansion.

Based on the generated probabilities in the output matrix, training and prediction module 106c selects (step 208) one of the candidate words as a replacement word for the abbreviation. In some embodiments, module 106c selects the candidate word with the highest probability as the replacement word. Other methods for using the probability values to select the replacement word can be contemplated within the scope of invention.

After a replacement word has been selected for each unrecognized abbreviation in the input search query, query revision module 106d of server computing device 106 generates (step 210) a new search query by replacing each of the abbreviations in the initial search query with the selected replacement word. For example, if the initial search query is 'List of rollover options for retirement acct,' query revision module 106d modifies the initial search query using the replacement word to generate the following new search query: 'List of rollover options for retirement account.' Once the new search query is generated, module 106d transmits the new search query to query execution module 108a of search engine server 108 for execution against search results database 110c.

Query execution module 108a retrieves (step 212) from database 110c one or more search results (e.g., indexed documents) that are responsive to the query by executing a search on database 110c. Module 108a displays (step 214) the retrieved search results to the user at client computing device 102. For example, module 108a can generate a user interface (e.g., web page) that contains the search results in a structured format (e.g., a list of links to each document, along with identifying metadata such as title, authors, date, excerpts of relevant document sections, etc.) and enables the user at client computing device 102 to review the results and select one or more documents. When the user selects one of the documents in the search results (e.g., by clicking a link), client computing device 102 issues a command to search engine server 108 to retrieve and display the corresponding document.

In some embodiments, query execution module 108a can provide to training and prediction module 106c information associated with the document requested by the user from the search results. Because the user selected a specific document, it can confirm that the replacement word integrated into the new search query is the correct expansion of the abbreviation entered by the user in the initial search query. As a result, training and prediction module 106c can add the abbreviation-replacement word pair to, e.g., abbreviation dictionary database 110b for future disambiguation of the abbreviation. As mentioned above, system 100 can perform disambiguation of unrecognized abbreviations in a search query in real time—meaning that upon receiving the initial search query, system 100 can automatically determine suitable replacement words for unrecognized abbreviations and replace them to generate a new search query, then execute the new search query to provide search results to the user without the user being aware that such replacement has taken place.

Figure 6:
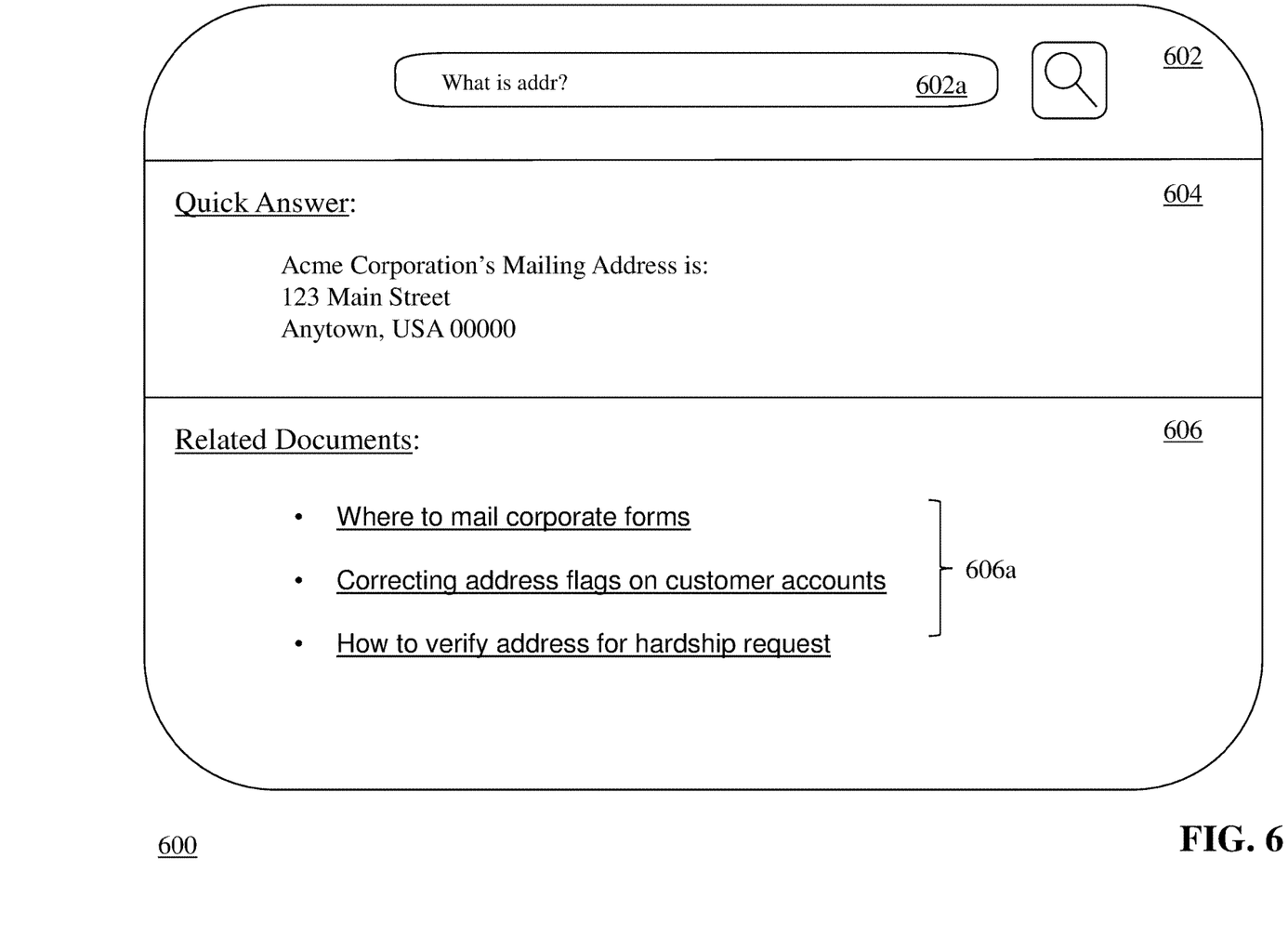
FIG. 6 is a diagram of an exemplary user interface displaying search results based on a disambiguated search query.

FIG. 6 is a diagram of an exemplary user interface 600 displaying search results based on a disambiguated search query as executed by search engine server 108. As shown in FIG. 6, user interface 600 comprises a search query input section 602, a quick answer section 604, and a related documents section 606. The search query entered by the user ('What is addr?') is displayed in the query input box 602a, and includes the unrecognized abbreviation 'addr.' When the user clicks the search button 602b, system 100 executes the disambiguation process described herein to convert the unrecognized abbreviation 'addl.' in the search query into the expanded word 'address,' revise the search query to include the expanded word, and instructs query execution module 108a to run the revised search query against database 110c.

Query execution module 108a returns one or more search results which are displayed in sections 604 and 606 of user interface 600. As shown in section 604, the search results can include specific information extracted from one or more indexed documents that are matched to the search query. For example, query execution module 108a can be configured to extract the corporate mailing address from a particular document and display it in section 604. Similarly, query execution module 108a can display in section 606 a set of links 606a to specific documents returned in the search. As shown, the documents are relevant to the term 'address' and can be accessed by the user of client computing device 102 to obtain the desired information.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for disambiguating unrecognized abbreviations in search queries using machine learning, the system comprising a server computing device having a memory for storing computer-executable instructions and a processor that executes the computer-executable instructions to:
 establish a search session between a client computing device and a search interface of the server computing device;
 receive an initial search query from a user of the client computing device via the search interface, the initial search query comprising a plurality of terms including one or more unrecognized abbreviations and one or more other terms;
 detect the one or more unrecognized abbreviations in the initial search query, including:
  generating, for each term in the initial search query, a separate search query and submitting each separate search query to a search engine for execution during the established search session to determine whether any responsive documents are returned for the term from the search engine,
  identifying the one or more terms in the initial search query that (i) are shorter than a predetermined length and (ii) for which the separate search query for the term returns zero responsive documents from the search engine,
  identifying the one or more terms that include all characters of the unrecognized abbreviations in a same order, and
  assigning the one or more identified terms as the detected one or more unrecognized abbreviations;
 generate one or more candidate words for each of the detected one or more unrecognized abbreviations in the initial search query;
 for each of the detected one or more unrecognized abbreviations:
  execute a trained disambiguation machine learning model using the one or more candidate words for the detected unrecognized abbreviation as input to generate, for each of the one or more candidate words, a probability that the candidate word is intended by the user to be an expansion of the detected unrecognized abbreviation, including converting the detected unrecognized abbreviation and the one or more candidate words for the detected unrecognized abbreviation into a representation that is ingestible by the trained disambiguation machine learning model, and
  select one of the candidate words as a replacement word for the detected unrecognized abbreviation based upon the generated probability for each of the one or more candidate words;
 generate a new search query based upon the initial search query by replacing each of the detected one or more unrecognized abbreviations in the initial search query with the replacement word for the detected unrecognized abbreviation;
 submit the new search query to the search engine for execution during the established search session and retrieve one or more search results from the search engine; and
 display the one or more search results to the user of the client computing device.

2. The system of claim 1, wherein the server computing device receives a selection of one of the displayed search results from the user of the client computing device.

3. The system of claim 2, wherein the server computing device generates an abbreviation-replacement word pair for each replacement word in the new search query based upon the selection received from the user of the client computing device.

4. The system of claim 3, wherein the server computing device stores the abbreviation-replacement word pairs in a disambiguation dictionary data structure.

5. The system of claim 1, wherein the server computing device generates the trained disambiguation machine learning model by:
 capturing a corpus of unstructured text from one or more data sources;
 selecting one or more terms from the corpus of unstructured text, each term comprising a text string shorter than a predetermined length;
 for each term:
  execute the search engine on the term to determine whether any responsive documents are returned by the search engine,
  classify the term as an unrecognized abbreviation when no responsive documents are returned by the search engine,
  identify one or more candidate words for the unrecognized abbreviation from a plurality of indexed documents,
  determine that one of the candidate words is a correct expansion of the unrecognized abbreviation, and
  assign the determined candidate word to the unrecognized abbreviation;
 generate a training data set based upon the one or more unrecognized abbreviations and the assigned candidate words; and
 train a disambiguation machine learning model on the training data set to generate the trained disambiguation machine learning model.

6. The system of claim 5, wherein identifying one or more candidate words for the unrecognized abbreviation from a plurality of indexed documents comprises:
 identifying a first set of words in the plurality of indexed documents that share a first character with the unrecognized abbreviation;
 selecting one or more words from the first set of words that include all of the characters of the unrecognized abbreviation; and
 assigning the selected words as the one or more candidate words.

7. The system of claim 6, wherein the server computing device determines that one of the candidate words is a correct expansion of the unrecognized abbreviation by displaying the unrecognized abbreviation and the candidate words on a remote computing device and receiving a selection of one of the candidate words from a user of the remote computing device.

8. The system of claim 5, wherein the corpus of unstructured text comprises one or more of: chat message logs or user comments to articles.

9. The system of claim 1, wherein the trained disambiguation machine learning model comprises at least one of a linear regression algorithm, a decision tree algorithm, a support vector machine, a random forest algorithm, a neural network, or a Bayesian classification algorithm.

10. The system of claim 1, wherein the server computing device converts each of the one or more candidate words into a first numeric representation and each of the and the one or more unrecognized abbreviations into a second numeric representation prior to executing the trained disambiguation machine learning model.

11. The system of claim 10, wherein the first numeric representation and the second numeric representation each comprises a multidimensional vector of features.

12. The system of claim 1, wherein generating one or more candidate words for each of the unrecognized abbreviations in the initial search query comprises, for each unrecognized abbreviation:
 identifying a first set of words in a plurality of indexed documents that share a first character with the unrecognized abbreviation;
 selecting one or more words from the first set of words that include all of the characters of the unrecognized abbreviation; and
 assigning the selected words as the one or more candidate words.

13. A computerized method of disambiguating unrecognized abbreviations in search queries using machine learning, the method comprising:
 establishing, by a server computing device, a search session between a client computing device and a search interface of the server computing device;
 receiving, by the server computing device, an initial search query from a user of the client computing device via the search interface, the initial search query comprising a plurality of terms including one or more unrecognized abbreviations and one or more other terms;
 detecting, by the server computing device, the one or more unrecognized abbreviations in the initial search query, including:
  generating, for each term in the initial search query, a separate search query and submitting each separate search query to a search engine for execution during the established search session to determine whether any responsive documents are returned for the term from the search engine,
  identifying the one or more terms in the initial search query that (i) are shorter than a predetermined length and (ii) for which the separate search query for the term returns zero responsive documents from the search engine,
  identifying the one or more terms that include all characters of the unrecognized abbreviations in a same order, and
  assigning the one or more identified terms as the detected one or more unrecognized abbreviations;
 generating, by the server computing device, one or more candidate words for each of the detected one or more unrecognized abbreviations in the initial search query;
 for each of the detected one or more unrecognized abbreviations:
  executing, by the server computing device, a trained disambiguation machine learning model using the one or more candidate words for the detected unrecognized abbreviation as input to generate, for each of the one or more candidate words, a probability that the candidate word is intended by the user to be an expansion of the detected unrecognized abbreviation, including converting the detected unrecognized abbreviation and the one or more candidate words for the detected unrecognized abbreviation into a representation that is ingestible by the trained disambiguation machine learning model, and
  selecting, by the server computing device, one of the candidate words as a replacement word for the detected unrecognized abbreviation based upon the generated probability for each of the one or more candidate words;
 generating, by the server computing device, a new search query based upon the initial search query by replacing each of the detected one or more unrecognized abbreviations in the initial search query with the replacement word for the detected unrecognized abbreviation;
 submitting, by the server computing device, the new search query to the search engine for execution during the established search session and retrieve one or more search results from the search engine; and
 displaying, by the server computing device, the one or more search results to the user of the client computing device.

14. The method of claim 13, wherein the server computing device receives a selection of one of the displayed search results from the user of the client computing device.

15. The method of claim 14, further comprising generating, by the server computing device, an abbreviation-replacement word pair for each replacement word in the new search query based upon the selection received from the user of the client computing device.

16. The method of claim 15, further comprising storing, by the server computing device, the abbreviation-replacement word pairs in a disambiguation dictionary data structure.

17. The method of claim 13, wherein the server computing device generates the trained disambiguation machine learning model by:
 capturing a corpus of unstructured text from one or more data sources;
 selecting one or more terms from the corpus of unstructured text, each term comprising a text string shorter than a predetermined length;
 for each term:
  execute the search engine on the term to determine whether any responsive documents are returned by the search engine,
  classify the term as an unrecognized abbreviation when no responsive documents are returned by the search engine,
  identify one or more candidate words for the unrecognized abbreviation from a plurality of indexed documents,
  determine that one of the candidate words is a correct expansion of the unrecognized abbreviation, and
  assign the determined candidate word to the unrecognized abbreviation;
 generate a training data set based upon the one or more unrecognized abbreviations and the assigned candidate words; and
 train a disambiguation machine learning model on the training data set to generate the trained disambiguation machine learning model.

18. The method of claim 17, wherein identifying one or more candidate words for the unrecognized abbreviation from a plurality of indexed documents comprises:
 identifying a first set of words in the plurality of indexed documents that share a first character with the unrecognized abbreviation;
 selecting one or more words from the first set of words that include all of the characters of the unrecognized abbreviation; and
 assigning the selected words as the one or more candidate words.

19. The method of claim 18, further comprising determining, by the server computing device, that one of the candidate words is a correct expansion of the unrecognized abbreviation by displaying the unrecognized abbreviation and the candidate words on a remote computing device and receiving a selection of one of the candidate words from a user of the remote computing device.

20. The method of claim 17, wherein the corpus of unstructured text comprises one or more of: chat message logs or user comments to articles.

21. The method of claim 13, wherein the trained disambiguation machine learning model comprises at least one of a linear regression algorithm, a decision tree algorithm, a support vector machine, a random forest algorithm, a neural network, or a Bayesian classification algorithm.

22. The method of claim 13, wherein the server computing device each of the one or more candidate words into a first numeric representation and each of the and the one or more unrecognized abbreviations into a second numeric representation prior to executing the trained disambiguation machine learning model.

23. The method of claim 22, wherein the first numeric representation and the second numeric representation each comprises a multidimensional vector of features.

24. The method of claim 13, wherein generating one or more candidate words for each of the unrecognized abbreviations in the initial search query comprises, for each abbreviation:
  identifying a first set of words in a plurality of indexed documents that share a first character with the unrecognized abbreviation;
  selecting one or more words from the first set of words that include all of the characters of the unrecognized abbreviation; and
  assigning the selected words as the one or more candidate words.

* * * * *

UNITED STATES PATENT AND TRADEMARK OFFICE
CERTIFICATE OF CORRECTION

| | |
|---|---|
| PATENT NO. | : 12,124,485 B2 |
| APPLICATION NO. | : 17/897593 |
| DATED | : October 22, 2024 |
| INVENTOR(S) | : Yourong Xu |

It is certified that error appears in the above-identified patent and that said Letters Patent is hereby corrected as shown below:

In the Specification

Column 14, Line 31:
unrecognized abbreviation 'addl.' in the search query into
Should read as follows:
unrecognized abbreviation 'addr' in the search query into Signed and Sealed this
Twenty-fifth Day of March, 2025

Coke Morgan Stewart
*Acting Director of the United States Patent and Trademark Office*